(12) United States Patent
Peng et al.

(10) Patent No.: US 10,894,697 B1
(45) Date of Patent: Jan. 19, 2021

(54) SELF-DETECTION DEVICE FOR LINER PLATE OF HOISTING CONTAINER AND DETECTION METHOD

(71) Applicants: CHINA UNIVERSITY OF MINING AND TECHNOLOGY, Jiangsu (CN); XUZHOU COAL MINE SAFETY EQUIPMENT MANUFACTURE CO. LTD., Jiangsu (CN)

(72) Inventors: Yuxing Peng, Jiangsu (CN); Zhencai Zhu, Jiangsu (CN); Zhentao Mi, Jiangsu (CN); Gongbo Zhou, Jiangsu (CN); Guohua Cao, Jiangsu (CN); Songyong Liu, Jiangsu (CN); Guoan Chen, Jiangsu (CN); Hao Lu, Jiangsu (CN); Wei Li, Jiangsu (CN); Junliang Liu, Jiangsu (CN)

(73) Assignees: CHINA UNIVERSITY OF MINING AND TECHNOLOGY, Jiangsu (CN); XUZHOU COAL MINE SAFETY EQUIPMENT MANUFACTURE CO. LTD. :, Jiangsu (CN)

( * ) Notice: Subject to any disclaimer, the term of this patent is extended or adjusted under 35 U.S.C. 154(b) by 0 days.

(21) Appl. No.: 16/076,318

(22) PCT Filed: Dec. 4, 2017

(86) PCT No.: PCT/CN2017/114388
§ 371 (c)(1),
(2) Date: Aug. 7, 2018

(87) PCT Pub. No.: WO2018/218911
PCT Pub. Date: Dec. 6, 2018

(30) Foreign Application Priority Data

May 27, 2017 (CN) .......................... 2017 1 0388284

(51) Int. Cl.
*B65G 47/20* (2006.01)
*B66B 17/08* (2006.01)
(Continued)

(52) U.S. Cl.
CPC .............. *B66B 17/08* (2013.01); *B65G 47/20* (2013.01); *G01L 5/0052* (2013.01); *G01N 3/30* (2013.01); *G01N 19/02* (2013.01)

(58) Field of Classification Search
CPC ........ B66B 17/08; B65G 47/02; B65G 47/16; B65G 47/18; B65G 47/20; B65G 65/28; (Continued)

(56) References Cited

U.S. PATENT DOCUMENTS

| 2013/0220776 A1* | 8/2013 | DePaso | B65G 43/00 |
| | | | 198/617 |
| 2014/0224624 A1* | 8/2014 | DePaso | B65G 15/62 |
| | | | 198/837 |

FOREIGN PATENT DOCUMENTS

| CN | 103048262 A | * | 4/2013 | ............. G01N 19/02 |
| CN | 203079501 U | | 7/2013 | |

(Continued)

*Primary Examiner* — Herbert K Roberts
(74) *Attorney, Agent, or Firm* — Foley & Lardner LLP

(57) ABSTRACT

The present invention discloses a self-detection device for a liner plate of a hoisting container and a detection method. The device mainly includes: a frame, a baffle-type hoist conveyor, a horizontal conveyor, a loading hopper assembly, an unloading hopper assembly, a liner plate assembly, and a hoisting container system. The loading hopper assembly is fixedly mounted to an upper right end of the frame, the unloading hopper assembly is fixedly mounted to a lower left end of the frame, the hoisting container system is arranged on an upper left portion of the frame and above the unloading hopper assembly, and the liner plate assembly is provided inside the hoisting container system. A feed port of the baffle-type hoist conveyor is connected to an unloading (Continued)

port of the unloading hopper, and a discharge port thereof is joined to a loading port of a loading hopper; and a feed port of the horizontal conveyor is connected to an unloading port of the loading hopper, and a discharge port thereof is arranged at a feed port on an upper end of the hoisting container system. The self-detection liner plate can simulate an impact, friction, and wear behavior on a liner plate of a hoisting container in an actual loading process; and can measure in real time an impact force and friction force bored by the liner plate when a material falls down to impact on the liner plate. In addition, the self-detection liner plate enables continuous loading of materials.

10 Claims, 6 Drawing Sheets

(51) Int. Cl.
  *G01N 3/30* (2006.01)
  *G01N 19/02* (2006.01)
  *G01L 5/00* (2006.01)

(58) Field of Classification Search
  CPC ...... B65G 67/60; B65G 67/606; G01N 19/02; G01N 3/30; G01N 3/303; G01N 3/307; G01N 3/31; G01N 3/313; G01N 3/317; G01L 5/0052
  See application file for complete search history.

(56) References Cited

FOREIGN PATENT DOCUMENTS

| | | |
|---|---|---|
| CN | 203602197 U | 5/2014 |
| CN | 203946508 U | 11/2014 |
| CN | 105417200 A | 3/2016 |
| CN | 107421833 A | 12/2017 |
| WO | WO-2017051566 A1 | 3/2017 |

* cited by examiner

SELF-DETECTION DEVICE FOR LINER PLATE OF HOISTING CONTAINER AND DETECTION METHOD

BACKGROUND OF THE INVENTION

Technical Field

The present invention relates to the field of detection of a liner plate of a hoisting container, and in particular, to an impact detection device for a liner plate of a hoisting container and a detection method.

Background

A skip is a main hoisting apparatus in a mine shaft, and is widely used as a hoisting container for a main shaft of a coal mine. The skip is used to directly carry coal, to convey the coal through the mine shaft. Because the coal production in a modern mine shaft is particularly large, the lifting quantity of skip is increasing, and the loading pressure is also increasing. A stable and long-term operation of the skip is crucial to hoisting, conveyance, and production in the whole mine shaft. In an actual hoisting condition, a liner plate of the skip is a primary wearing part, which takes a direct impact and friction from coal, waste rocks and other minerals, and bears rather complicated loads. Therefore, the liner plate is required to have a rather high strength and wear resistance.

Currently, the wildly used material of skip liner plate in mining-machinery plant is 16Mn steel, where the liner plate is formed by multiple 16Mn steel of different size and thickness. The 16Mn steel has high toughness and good impact resistance, but poor wear and corrosion resistance. During routine production, the skip liner plate for material hoisting in a shaft needs to be frequently maintained or replaced due to its poor wear resistance. The maintenance or replacement is troublesome, and even it is required to suspend the production and wait a period, thus severely affecting mining efficiency. For the hoisting skip, the wear of the liner plate is the primary cause of frequent damage to the skip.

SUMMARY OF THE INVENTION

A technical problem to be solved by the present invention is to provide a self-detection device for a liner plate of a hoisting container and a detection method, where the device has a simple structure, is securely and conveniently operated, and can truly and comprehensively simulate actual impact, friction and wear conditions, so as to analyze a damage mechanism of the liner plate of the hoisting container, and provide a theoretical basis for prolonging the service life of the liner of a hoisting skip.

The present invention provides the following technical solutions to solve the foregoing technical problem.

A self-detection device for a liner plate of a hoisting container is provided, which includes: a frame (5), a baffle-type hoist conveyor (2), a horizontal conveyor (16), a loading hopper assembly, an unloading hopper assembly, a liner plate assembly, and a hoisting container system that can reciprocally move up and down. The loading hopper assembly is fixedly mounted to an upper right end of the frame (5), the unloading hopper assembly (7) is fixedly mounted to a lower left end of the frame (5), the hoisting container system is arranged on an upper left portion of the frame (5) and above the unloading hopper assembly (7), and the liner plate assembly is provided inside the hoisting container system. A feed port of the baffle-type hoist conveyor (2) is connected to an unloading port of the unloading hopper (7), and a discharge port thereof is joined to a loading port of a loading hopper (1); and a feed port of the horizontal conveyor (16) is connected to an unloading port of the loading hopper (1), and a discharge port thereof is arranged at a feed port on an upper end of the hoisting container system, such that falling materials can directly impact the liner plate assembly inside the hoisting container system.

The liner plate assembly includes a liner plate backboard (12), a guide rail (40), a slide block (44), a liner plate (41), an impact force sensor (42), a bearing (23), and a tension-compression sensor (21). The guide rail (40) is fixed on a front side of the liner plate backboard (12), the slide block (44) is arranged on the guide rail (40) and slidably connected to the guide rail (40), and the liner plate (41) is fixedly connected to the slide block (44). An upper end of the liner plate (41) is connected to an upper end of the liner plate backboard (12) via the tension-compression sensor (21); one end of the tension-compression sensor (21) is connected to the liner plate (41) with a stud bolt (43), and the other end thereof is fixedly mounted to the bearing (23) with a bolt (22); and one side of the impact force sensor (42) is fixed onto the liner plate backboard (12), and the other side thereof is in contact with a left plate surface of a hoisting container (11). The bearing (23) includes an upper bearing pair and a lower bearing pair, where two bearings of the upper bearing pair are respectively disposed on two upper ends of the liner plate backboard (12), and the two bearings of the lower bearing pair are respectively disposed on two lower ends of the liner plate backboard (12).

Four guide grooves (24) corresponding to the bearings are symmetrically welded up and down onto the left plate surface of the hoisting container (11), such that the bearing (23) on the liner plate backboard (12) moves in the guide grooves (24).

The tension-compression sensor (21) is used for measuring a friction force borne by the liner plate (41) when a material falls down to impact on the liner plate.

The impact force sensor (42) is used for measuring an impact force borne by the liner plate (41) when the material falls down to impact on the liner plate.

Further, the hoisting container system includes a hoisting container (11), two towing plates (25), a lifting hook (13), a steel rope (14), a pulley (15), a pulley bracket, and a hand-operated capstan (17). A directional wheel (10) is fixed on each of four plate surfaces of the hoisting container (11); one of the two towing plates (25) is disposed on the top of a lateral side of the hoisting container (11), and the other towing plate is disposed on the top of an opposite side; the towing plates (25) are each provided with a connection ring (48); the pulley bracket is fixedly mounted on the top of the frame (5), the pulley (15) is mounted on the pulley bracket, and the hand-operated capstan (17) is mounted on the frame (5). The connection rings (48) are directly towed by the lifting hook (13); and one end of the steel rope (14) is connected to a middle portion of the lifting hook (13), and the other end passes through the pulley (15) to connect to the hand-operated capstan (17).

Further, the baffle-type hoist conveyor (2) includes a baffle conveyor belt, a baffle-type hoist conveyor support (3), a first variable-speed servo motor (27), a first driven drum, and a first driving drum, where the baffle-type hoist conveyor support (3) is fixed to the frame (5), the first driven drum and the first driving drum are both provided on the baffle-type hoist conveyor support (3), the baffle conveyor belt is wounded around the first driven drum and the first driving drum, and the first variable-speed servo motor (27) is mounted on the frame (5) and is connected to the first driving drum in a transmission manner. The horizontal conveyor (16) includes a horizontal conveyor belt, a horizontal conveyor support (4), a second variable-speed servo motor (30), a second driven drum, and a second driving drum, where the horizontal conveyor support (4) is fixed to the frame (5), the second driven drum and the second driving drum are both provided on the horizontal conveyor support (4), the horizontal conveyor belt is wounded around the second driven drum and the second driving drum, and the second variable-speed servo motor (30) is mounted on the frame (5) and is connected to the second driving drum in a transmission manner.

Further, the baffle-type hoist conveyor support (3) includes a first support and a second support, where the first support and the second support are both fixed to the frame (5), the first driven drum is disposed on the first support, and the first driving drum is disposed on the second support; and the second support includes a first upper support, a first lower support, and a first spiral lifting mechanism, and the first upper support and the first lower support are connected together via the first spiral lifting mechanism. The spiral lifting mechanism is mainly formed by a lead screw (34) and a rotating nut (31), where the rotating nut (31) is in threaded connection with the lead screw (34), the lead screw (34) is fixedly mounted on the first lower support, and the rotating nut (31) is fixedly mounted on the first upper support. The horizontal conveyor support (4) includes a third support and a fourth support, where the third support and the fourth support are both fixed to the frame (5), the second driven drum is disposed on the third support, and the second driving drum is disposed on the fourth support; and the fourth support includes a second upper support, a second lower support, and a second spiral lifting mechanism, and the second upper support and the second lower support are connected together via the second spiral lifting mechanism. The spiral lifting mechanism is mainly formed by a lead screw (34) and a rotating nut (31), where the rotating nut (31) is in threaded connection with the lead screw (34), the lead screw (34) is fixedly mounted on the second lower support, and the rotating nut (31) is fixedly mounted on the second upper support.

Preferably, the frame (5) is formed by fixedly connecting four girders (29), six beams (39), and eight uprights (36). The four girders (29) are respectively a first girder (46), a second girder (45), a third girder (49), and a fourth girder (50); the six beams (39) are respectively a first beam (53), a second beam (51), a third beam (54), a fourth beam (52), a fifth beam (55), and a sixth beam (56); and the eight uprights (36) are respectively, a first upright (62), a second upright (57), a third upright (58), a fourth upright (32), a fifth upright (59), a sixth upright (63), a seventh upright (61), and an eighth upright (60). The first girder (46), the first beam (53), the second girder (45) and the second beam (51) are connected end to end to form a first rectangular frame; the third girder (49), the third beam (54), the fourth girder (50), and the fourth beam (52) are connected end to end to form a second rectangular frame; and the first rectangular frame and the second rectangular frame are arranged up and down oppositely. Four right angles of the first rectangular frame are in one-to-one correspondence to four right angles of the second rectangular frame, where the four right angles of the first rectangular frame are respectively a first right angle, a second right angle, a third right angle, and a fourth right angle. A top end of the first upright (62) is connected to the first right angle, and a bottom end thereof is connected to a right angle of the second rectangular frame corresponding to the first right angle; a top end of the second upright (57) is connected to the second right angle, and a bottom end thereof is connected to a right angle of the second rectangular frame corresponding to the second right angle; a top end of the third upright (58) is connected to the third right angle, and a bottom end thereof is connected to a right angle of the second rectangular frame corresponding to the third right angle; and a top end of the fourth upright (32) is connected to the fourth right angle, and a bottom end thereof is connected to a right angle of the second rectangular frame corresponding to the fourth right angle. One end of the fifth beam (55) is connected to the first girder (46), and the other end thereof is connected to the second girder (45); and one end of the sixth beam (56) is connected to the third girder (49), and the other end thereof is connected to the fourth girder (50). A top end of the fifth upright (59) is connected to the second girder (45), and a bottom end thereof is connected to the fourth girder (50); a top end of the sixth upright (63) is connected to the first girder (46), and a bottom end thereof is connected to the third girder (49); and the fifth beam (55), the fifth upright (59), the sixth beam (56), and the sixth upright (63) form a third rectangular frame. A top end of the seventh upright (61) is connected to the first beam (53), and a bottom end thereof is connected to the third beam (54); and a top end of the eighth upright (60) is connected to the fifth beam (55), and a bottom end thereof is connected to the sixth beam (56).

Further, the hoisting container system is provided on the frame (5) via a hoisting container system holder, where the hoisting container system holder includes three short rods, two short beams (33), four short uprights (8), and four channel steels (9); and the three short rods are respectively a first short rod (20), a second short rod (37), and a third short rod. One end of the first short rod (20) is connected to the seventh upright (61), and the other end thereof is connected to the eighth upright (60). One end of the second short rod (37) is fixedly connected to the top of the seventh upright (61) of the frame (5), and the other end thereof is connected to the top of the eighth upright (60); and the first short rod (20), the eighth upright (60), the second short rod (37), and the seventh upright (61) form a fourth rectangular frame. One end of the third short rod is connected to the fourth upright (32) of the frame (5), and the other end thereof is connected to the sixth upright (63); and the third short rod and the first short rod (20) have the same vertical distance to the second rectangular frame. The two short beams (33) are a first short beam and a second short beam, where one end of the first short beam is connected to the fourth upright (32), and the other end is connected to the seventh upright (61); and one end of the second short beam is connected to the sixth upright (63), and the other end is connected to the eighth upright (60). The first short beam, the first short rod (20), the second short beam, and the third short rod are connected end to end to form a fifth rectangular frame. The four short uprights (8) include a first short upright, a second short upright, a third short upright, and a fourth short upright, where a lower end of the first short upright is connected to the first short rod (20), and an upper end thereof is connected to the second short rod (37); a lower end of the second short upright is connected to the first short rod (20), and an upper end thereof is connected to the second short rod (37); a lower end of the third short upright is connected to the third short rod, and an upper end thereof is connected to the first girder (46); and a lower end of the fourth short upright is connected to the third short rod, and an upper end thereof is connected to the first girder (46). The four short uprights (8) are all perpendicular to a plane in which the second rectangular frame is located. The four channel steels (9) are fixedly mounted to the first short upright, the second short upright, the third short upright, and the fourth short upright respectively. The channel steels (9) are used as rails through which the hoisting container system moves up and down.

Further, the loading hopper assembly includes the loading hopper (1), a first right-angle connecting groove (28), and a second right-angle connecting groove, where a front end of the loading hopper (1) is fixed on the right end of the second girder (45) of the frame (5) via the first right-angle connecting groove (28), and a rear end of the loading hopper (1) is fixed on the right end of the first girder (46) of the frame (5) via the second right-angle connecting groove. The unloading hopper assembly includes a fourth short rod (19), a fifth short rod, a third right-angle connecting groove (18), a fourth right-angle connecting groove, and the unloading hopper (7), where one end of the fourth short rod (19) is connected to the first upright (62), the other end thereof is connected to the fifth upright (59), and the fourth short rod (19) and the first short rod (20) have the same vertical distance to the second rectangular frame. One end of the fifth short rod is connected to the fourth upright (32) of the frame (5), the other end thereof is connected to the sixth upright (63), and the fifth short rod and the first short rod (20) have the same vertical distance to the second rectangular frame. A front end of the unloading hopper (7) is fixedly mounted to the fourth short rod (19) via the third right-angle connecting groove (18), and a rear end thereof is fixedly mounted to the fifth short rod via the fourth right-angle connecting groove.

Preferably, a lower panel of the unloading hopper (7) is provided with a trapezoidal opening, where a lower end of the trapezoidal opening is connected to the third short rod, and an upper end thereof is connected to the unloading port of the unloading hopper (7); the lower end of the trapezoidal opening is higher than the upper end; and a trapezoidal filter screen (6) is welded at the trapezoidal opening of the unloading hopper (7).

An impact, friction, and wear detection method for a self-detection liner plate of a hoisting container is provided, which includes the following steps:

(1) fixing channel steels (9) to short uprights (8) of a frame (5) respectively, and fixing directional wheels (10) to corresponding positions of four plate surfaces of a hoisting container (11);

(2) fixedly connecting a liner plate (41), a slide block (44), a guide rail (40), and a tension-compression sensor (21) onto a liner plate backboard (12), to complete assembly of a liner plate assembly;

(3) fixedly mounting the liner plate backboard (12) and the impact force sensor (42) onto the hoisting container (11);

(4) winding a steel rope (14) around a hand-operated capstan (17), connecting the other end of the rope to a lifting hook (13) through a pulley (15), and connecting the lifting hook (13) to connection rings (48) on towing plates (25), such that the lifting hook is connected to the hoisting container (11);

(5) rotating a rotation handle on the hand-operated capstan (17) to adjust the height of the hoisting container (11) to an initial position;

(6) starting a first variable-speed servo motor (27) and a second variable-speed servo motor (30), and adjusting operation speeds of a baffle-type hoist conveyor (2) and a horizontal conveyor (16) by adjusting frequency of a frequency converter;

(7) adding an impact coal material in a loading hopper (1), to simulate a friction motion of the liner plate of the hoisting container in an impact condition, measuring a friction force in an impact and friction process by using the tension-compression sensor (21), and measuring an impact force in the impact and friction process by using the impact force sensor (42); and (8) stopping the variable-speed servo motors after completion of parameter measurement, to end the test; and collecting the test coal material, and weighing the liner plate (41) before and after the experiment using a balance, to calculate a wear rate of impact and friction motion.

Preferably, when it is required to measure data at different impact angles, the rotation handle of the hand-operated capstan (17) is rotated to lower/raise the hoisting container (11), and then the impact test in steps (6) to (8) is repeated, and test parameters are recorded.

The present invention can simulate and measure an impact, friction, and wear behavior on a liner plate of a hoisting container, and achieves the following beneficial effects:

(1) Sufficient impact coal materials are added in a loading hopper (1), and thus a friction and wear behavior on a liner plate of a hoisting container in an actual impact condition can be simulated. A tension-compression sensor (21) and an impact force sensor (42) can measure in real time an impact force of the coal materials on the liner plate and a friction force between the coal materials and the liner plate.

(2) A first variable-speed servo motor (27) and a second variable-speed servo motor (28) are started, and operation speeds of a baffle-type hoist conveyor (2) and a horizontal conveyor (16) can be adjusted by adjusting frequency of a frequency converter. The height of the hoisting container (11) can be adjusted by rotating a rotation handle of a hand-operated capstan (17). In this way, the impact load, impact angle and impact height of the coal material can be adjusted, thus achieving friction detection in the case of angle, load, and height variations.

(3) The device has a simple structure and appropriate dimensions, and can be easily assembled.

(4) A lower panel of an unloading hopper (7) is provided with a trapezoidal opening that tilts downwards, such that the coal materials can slide back to the unloading hopper (7). In this way, the materials can be recycled, achieving a continuous impact loading of materials.

BRIEF DESCRIPTION OF THE DRAWINGS

Specific implementation manners of the present invention are further described in detail below with reference to the accompanying drawings, in which.

Figure 1:
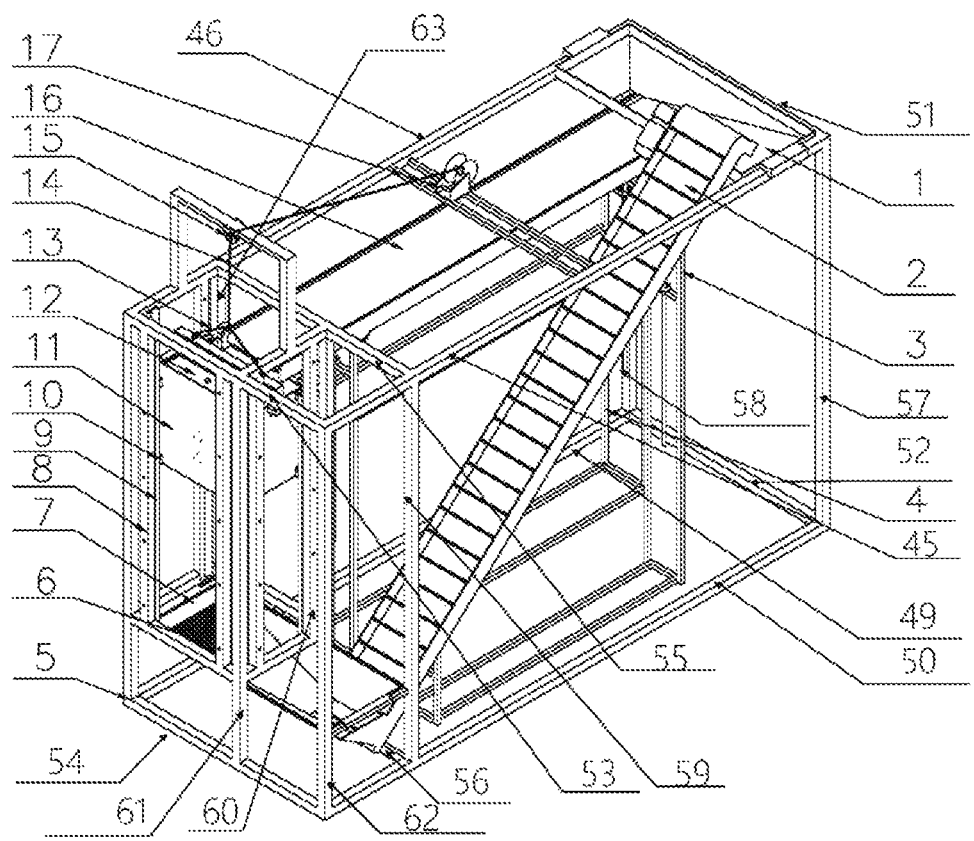
FIG. 1 is a schematic perspective view of a device of the present invention.

Description of reference numerals in the drawings: 1. Loading hopper, 2. Baffle-type hoist conveyor, 3. Baffle-type hoist conveyor support, 4. Horizontal conveyor support, 5. Frame, 6. Trapezoidal filter screen, 7. Unloading hopper, 8. Short upright, 9. Channel steel, 10. Directional wheel, 11. Hoisting container, 12. Liner plate backboard, 13. Lifting hook, 14. Steel rope, 15. Pulley, 16. Horizontal conveyor, 17. Hand-operated capstan, 18. Third right-angle connecting groove, 19. Fourth short rod, 20. First short rod, 21. Tension-compression sensor, 22. Bolt, 23. Bearing, 24. Guide groove, 25. Towing plate, 26. Externally protruding upright, 27. First variable-speed servo motor, 28. First right-angle connecting groove, 29. Girder, 30. Second variable-speed servo motor, 31. Rotating nut, 32. Fourth upright, 33. Short beam, 34. Lead screw, 35. Connection beam, 36. Upright, 37. Second short rod, 39. Beam, 40. Guide rail, 41. Liner plate, 42. Impact force sensor, 43. Stud bolt, 44. Slide block, 45. Second girder, 46. First girder, 47. Elongated beam, 48. Connection ring, 49. Third girder, 50. Fourth girder, 51. Second beam, 52. fourth beam, 53. First beam, 54. Third beam, 55. Fifth beam, 56. Sixth beam, 57. Second upright, 58. Third upright, 59. Fifth upright, 60. Eighth upright, 61. Seventh upright, 62. First upright, and 63. Sixth upright

DETAILED DESCRIPTION OF THE INVENTION

The present invention is further illustrated below with reference to the accompanying drawings and specific embodiments. It should be understood that, these examples are merely used to describe the present invention, but are not intended to limit the scope of the present invention. Various equivalent modifications made to the present invention by persons skilled in the art after reviewing the present invention shall all fall within the scope limited by the appended claims of the present invention.

FIG. 1 to FIG. 4 show a self-detection device for a liner plate of a hoisting container, which includes: a frame 5, a baffle-type hoist conveyor 2, a horizontal conveyor 16, a loading hopper assembly, an unloading hopper assembly, a liner plate assembly, and a hoisting container system that can be moved up and down. The loading hopper assembly is fixedly mounted to an upper right end of the frame 5 with a bolt, the unloading hopper assembly 7 is fixedly mounted to a lower left end of the frame 5, the hoisting container system is arranged on an upper left portion of the frame 5 and above the unloading hopper 7, and the liner plate assembly is provided inside the hoisting container system. A feed port of the baffle-type hoist conveyor 2 is connected to an unloading port of the unloading hopper 7, and a discharge port thereof is joined to a loading port of a loading hopper 1; and a feed port of the horizontal conveyor 16 is connected to an unloading port of the loading hopper 1, and a discharge port thereof is arranged at a feed port on an upper end of the hoisting container system, such that falling materials can directly impact the liner plate assembly inside the hoisting container system.

As shown in FIG. 1 to FIG. 4, the frame 5 is formed by welding four girders 29, six beams 39, and eight uprights 36. The four girders 29 are respectively a first girder 46, a second girder 45, a third girder 49, and a fourth girder 50; the six beams 39 are respectively a first beam 53, a second beam 51, a third beam 54, a fourth beam 52, a fifth beam 55, and a sixth beam 56; and the eight uprights 36 are respectively a first upright 62, a second upright 57, a third upright 58, a fourth upright 32, a fifth upright 59, a sixth upright 63, a seventh upright 61, and an eighth upright 60. The first girder 46, the first beam 53, the second girder 45 and the second beam 51 are welded end to end to form a first rectangular frame; the third girder 49, the third beam 54, the fourth girder 50, and the fourth beam 52 are welded end to end to form a second rectangular frame; and the first rectangular frame and the second rectangular frame are arranged up and down oppositely. Four right angles of the first rectangular frame are in one-to-one correspondence to four right angles of the second rectangular frame, where the four right angles of the first rectangular frame are respectively a first right angle, a second right angle, a third right angle, and a fourth right angle. A top end of the first upright 62 is connected to the first right angle, and a bottom end thereof is connected to a right angle of the second rectangular frame corresponding to the first right angle; a top end of the second upright 57 is connected to the second right angle, and a bottom end thereof is connected to a right angle of the second rectangular frame corresponding to the second right angle; a top end of the third upright 58 is connected to the third right angle, and a bottom end thereof is connected to a right angle of the second rectangular frame corresponding to the third right angle; and a top end of the fourth upright 32 is connected to the fourth right angle, and a bottom end thereof is connected to a right angle of the second rectangular frame corresponding to the fourth right angle. One end of the fifth beam 55 is connected to the first girder 46, and the other end thereof is connected to the second girder 45; and one end of the sixth beam 56 is connected to the third girder 49, and the other end thereof is connected to the fourth girder 50. A top end of the fifth upright 59 is connected to the second girder 45, and a bottom end thereof is connected to the fourth girder 50; a top end of the sixth upright 63 is connected to the first girder 46, and a bottom end thereof is connected to the third girder 49; and the fifth beam 55, the fifth upright 59, the sixth beam 56, and the sixth upright 63 are welded to form a third rectangular frame. A top end of the seventh upright 61 is connected to the first beam 53, and a bottom end thereof is connected to the third beam 54; and a top end of the eighth upright 60 is connected to the fifth beam 55, and a bottom end thereof is connected to the sixth beam 56. The frame 5 formed by welding according to the foregoing method has a stable structure and can meet the requirements of a technical problem to be solved.

As shown in FIG. 1 to FIG. 4, a first right-angle connecting groove 28 is welded at a front end of the loading hopper 1, and is fixed on the right end of the second girder 45 of the frame 5 via a bolt; and a second right-angle connecting groove is welded at a rear end of the loading hopper 1, and is fixed on the right end of the first girder 46 of the frame 5 via a bolt. A third right-angle connecting groove 18 is welded at a front end of the unloading hopper 7, and is fixed on the fourth short rod 19 via a bolt; and a fourth right-angle connecting groove is welded at a rear end of the unloading hopper 7, and is fixed on the fifth short rod via a bolt. The four right-angle connecting grooves are used to reinforce the loading hopper 1 and the unloading hopper 7, such that the hoppers can normally operate under a heavy material load. One end of the fourth short rod 19 is connected to the first upright 62, the other end thereof is connected to the fifth upright 59, and the fourth short rod 19 and the first short rod 20 have the same vertical distance to the second rectangular frame. One end of the fifth short rod is connected to the fourth upright 32 of the frame 5, the other end thereof is connected to the sixth upright 63, and the fifth short rod and the first short rod 20 have the same vertical distance to the second rectangular frame.

Figure 3:
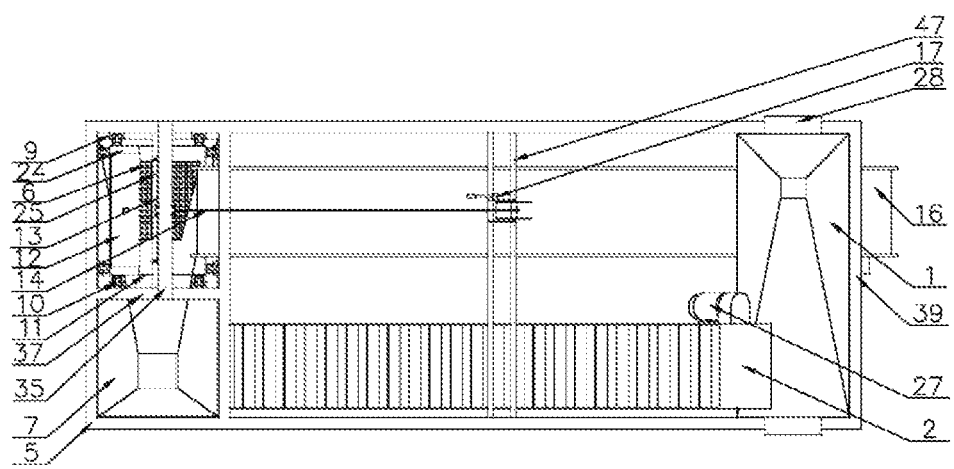
FIG. 3 is schematic top view of the device of the present invention.
Figure 4:
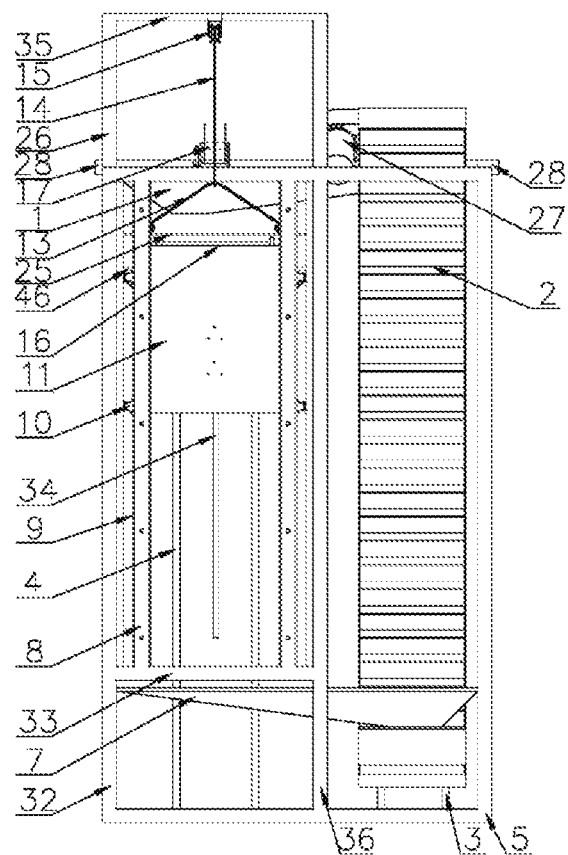
FIG. 4 is a schematic left view of a device of the present invention.

As shown in FIGS. 1, 3, and 4, a lower panel of the unloading hopper 7 is provided with a trapezoidal opening, where a lower end of the trapezoidal opening is connected to the third short rod, and an upper end thereof is connected to the unloading port of the unloading hopper 7; and the lower end of the trapezoidal opening is higher than the upper end, such that the coal materials can slide back to the unloading hopper and can be recycled. A trapezoidal filter screen 6 is welded at the trapezoidal opening of the unloading hopper 7; and is used to filter out, in real time, cinders broken during an impact.

As shown in FIG. 1 to FIG. 4, the baffle-type hoist conveyor 2 includes a baffle conveyor belt, a baffle-type hoist conveyor support 3, a first variable-speed servo motor 27, a first driven drum, and a first driving drum, where the baffle-type hoist conveyor support 3 is welded to the frame 5, the first driven drum and the first driving drum are both provided on the baffle-type hoist conveyor support 3, the baffle conveyor belt is wounded around the first driven drum and the first driving drum, and the first variable-speed servo motor 27 is mounted on the frame 5 and is connected to the first driving drum in a transmission manner. When the first variable-speed servo motor 27 is started, the material falls onto the baffle conveyor belt through the unloading hopper. The first driving drum is rotated to drive the baffle conveyor belt to move, so as to drive the first driven drum arranged below the baffle conveyor belt to rotate at the same speed. The material is conveyed by the baffle conveyor belt, reaches the terminal of the baffle conveyor belt, and falls down through the loading port of the loading hopper. The rotation speed of the first variable-speed servo motor 27 is adjusted by adjusting frequency of a frequency converter, to adjust the operation speed of the baffle-type hoist conveyor 2.

Figure 2:
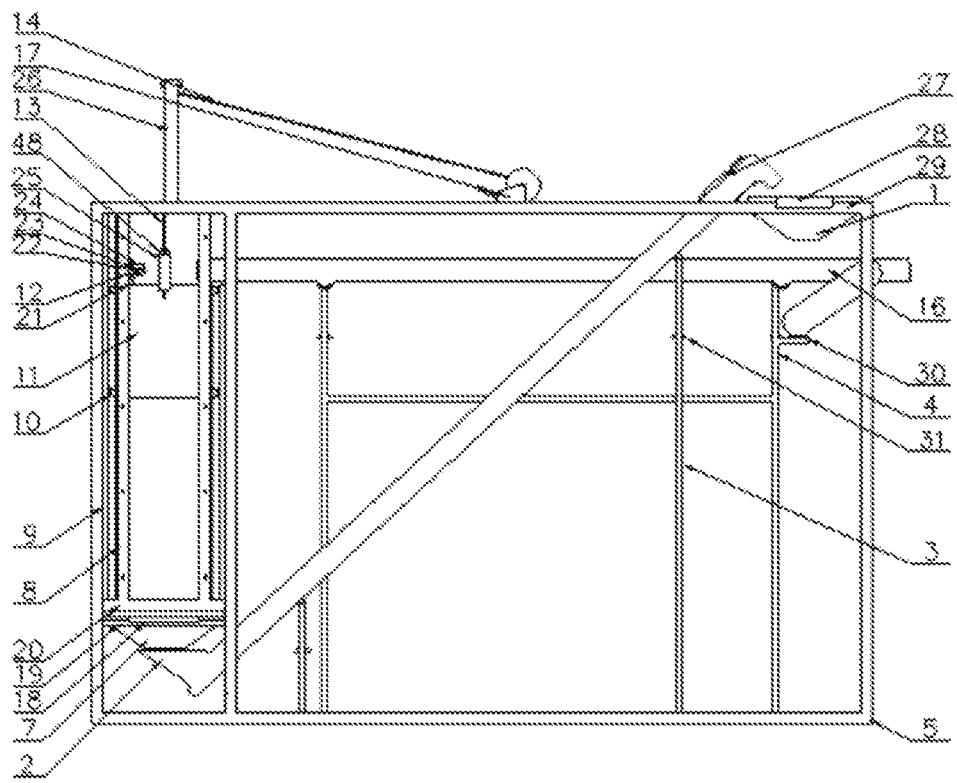
FIG. 2 is a schematic front view of the device of the present invention.

As shown in FIG. 1 and FIG. 2, the baffle-type hoist conveyor support 3 includes a first support and a second support, where the first support and the second support are both welded to the frame 5, the first driven drum is disposed on the first support, and the first driving drum is disposed on the second support. The second support includes a first upper support, a first lower support, and a first spiral lifting mechanism, and the first upper support and the first lower support are connected together via the first spiral lifting mechanism. The spiral lifting mechanism is mainly formed by a lead screw 34 and a rotating nut 31, where the rotating nut 31 is in threaded connection with the lead screw 34, the lead screw 34 is welded on the first lower support, and the rotating nut 31 is fixedly mounted on the first upper support, thus flexibly adjusting the height of the baffle-type hoist conveyor.

As shown in FIG. 1 to FIG. 4, the horizontal conveyor 16 includes a horizontal conveyor belt, a horizontal conveyor support 4, a second variable-speed servo motor 30, a second driven drum, and a second driving drum. The horizontal conveyor support 4 is welded to the frame 5, the second driven drum and the second driving drum are both provided on the horizontal conveyor support 4, the horizontal conveyor belt is wounded around the second driven drum and the second driving drum, and the second variable-speed servo motor 30 is mounted on the frame 5 and is connected to the second driving drum in a transmission manner. When the second variable-speed servo motor 30 is started, the material falls onto the horizontal conveyor belt through the unloading port of the loading hopper. The second driving drum is rotated to drive the horizontal conveyor belt to move, so as to drive the second driven drum arranged below the horizontal conveyor belt to rotate at the same speed. The material is conveyed by the horizontal conveyor belt, reaches the terminal of the horizontal conveyor belt, and falls down through a loading port of the hoisting container system. The rotation speed of the second variable-speed servo motor 30 is adjusted by adjusting frequency of a frequency converter, to adjust the operation speed of the horizontal conveyor 16 to control the falling amount of the material. In addition, the horizontal conveyor and the baffle-type hoist conveyor are consistent in operation speed as much as possible.

As shown in FIG. 1 and FIG. 2, the horizontal conveyor support 4 includes a third support and a fourth support, where the third support and the fourth support are both fixedly welded to the frame 5, the second driven drum is disposed on the third support, and the second driving drum is disposed on the fourth support. The fourth support includes a second upper support, a second lower support, and a second spiral lifting mechanism, and the second upper support and the second lower support are connected together via the second spiral lifting mechanism. The spiral lifting mechanism is mainly formed by a lead screw 34 and a rotating nut 31, where the rotating nut 31 is in threaded connection with the lead screw 34, the lead screw 34 is welded on the second lower support, and the rotating nut 31 is fixedly mounted on the second upper support, such that the height of the horizontal conveyor 16 can be flexibly adjusted.

As shown in FIG. 1 to FIG. 4, the hoisting container system includes a hoisting container 11, two towing plates 25, a lifting hook 13, a steel rope 14, a pulley 15, a pulley bracket, and a hand-operated capstan 17. A directional wheel 10 is fixed on each of four plate surfaces of the hoisting container 11. The towing plates 25 are welded between a front panel and a rear panel of the hoisting container 11. One of the two towing plates 25 is disposed on the top of a lateral side of the hoisting container 11, and the other towing plate is disposed on the top of an opposite side. Two connection rings 48 are symmetrically mounted on the towing plates respectively. Two externally protruding uprights 26 are welded on the first girder 46 and the second short rod 37 of the frame 5 respectively, a connection beam 35 is welded between the externally protruding uprights 26, and a pulley 15 is fixed on a middle portion of the connection beam 35 with a bolt. Two elongated beams 47 are welded between middle portions of the first girder 46 and the second girder 45 of the frame 5. A hand-operated capstan 17 with a self-locking property is fixed on the elongated beams 47 with bolts. The steel rope 14 is wound around the hand-operated capstan 17, and the other end of the rope passes through the pulley 15 on the externally protruding uprights to connect to the middle of the lifting hook 13. The lifting hook 13 is connected to the connection rings 48 on the towing plates 25, to connect to the hoisting container 11. The height of the hoisting container 11 can be adjusted by rotating the hand-operated capstan 17.

As shown in FIG. 1 to FIG. 4, the hoisting container system is provided on the frame 5 via a hoisting container system holder, where the hoisting container system holder includes three short rods, two short beams 33, four short uprights 8, and four channel steels 9; and the three short rods are respectively a first short rod 20, a second short rod 37, and a third short rod. One end of the first short rod 20 is connected to the seventh upright 61, and the other end thereof is connected to the eighth upright 60. One end of the second short rod 37 is fixedly connected to the top of the seventh upright 61 of the frame 5, and the other end thereof is connected to the top of the eighth upright 60; and the first short rod 20, the eighth upright 60, the second short rod 37, and the seventh upright 61 form a fourth rectangular frame. One end of the third short rod is connected to the fourth upright 32 of the frame 5, and the other end thereof is connected to the sixth upright 63; and the third short rod and the first short rod 20 have the same vertical distance to the second rectangular frame. The two short beams 33 are a first short beam and a second short beam, where one end of the first short beam is connected to the fourth upright 32, and the other end is connected to the seventh upright 61; and one end of the second short beam is connected to the sixth upright 63, and the other end is connected to the eighth upright 60. The first short beam, the first short rod 20; the second short beam, and the third short rod are connected end to end to form a fifth rectangular frame. The four short uprights 8 include a first short upright, a second short upright, a third short upright, and a fourth short upright, where a lower end of the first short upright is connected to the first short rod 20, and an upper end thereof is connected to the second short rod 37; a lower end of the second short upright is connected to the first short rod 20, and an upper end thereof is connected to the second short rod 37; a lower end of the third short upright is connected to the third short rod, and an upper end thereof is connected to the first girder 46; and a lower end of the fourth short upright is connected to the third short rod, and an upper end thereof is connected to the first girder 46. The four short uprights 8 are all perpendicular to a plane in which the second rectangular frame is located. A through hole is disposed on each short upright 8. The four channel steels 9 are fixedly mounted to the first short upright, the second short upright, the third short upright, and the fourth short upright respectively with bolts. The channel steels 9 are used as rails through which the hoisting container system moves up and down.

Figure 5:
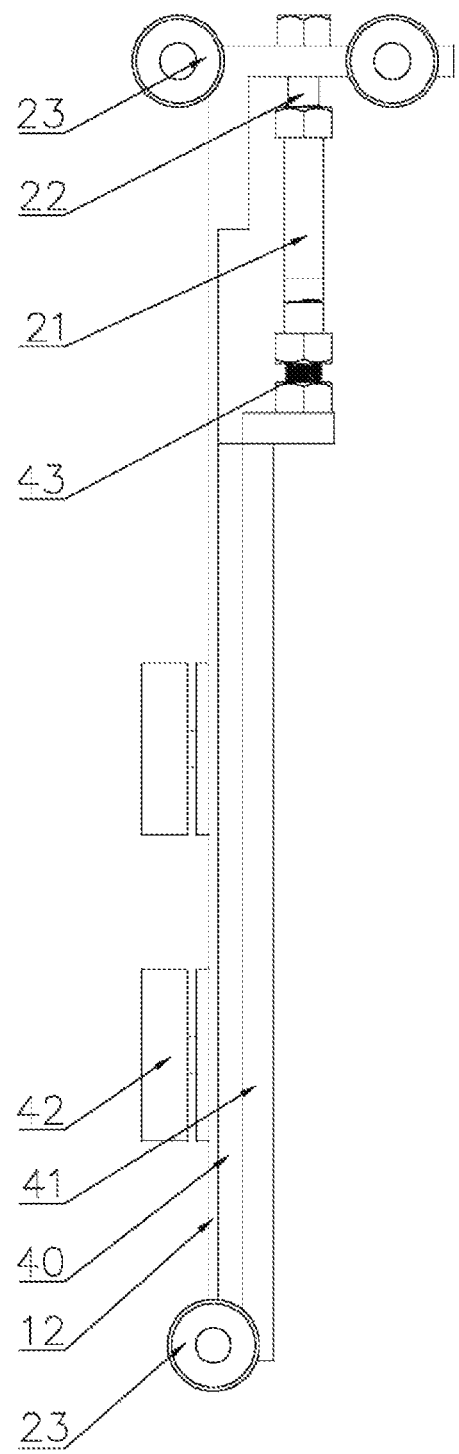
FIG. 5 is a schematic diagram (right view) of mounting of a liner plate assembly, an impact force sensor, and a tension-compression sensor in the device of the present invention.
Figure 6:
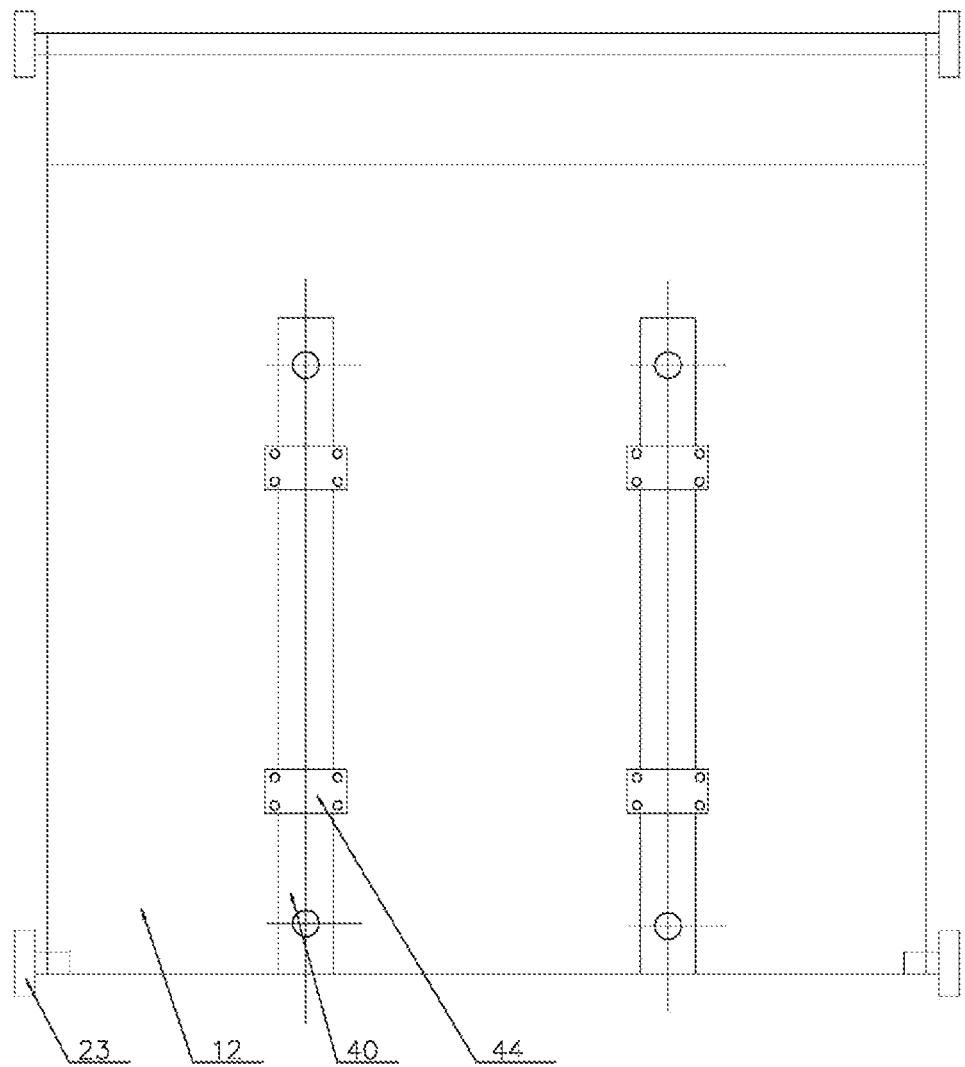
FIG. 6 is a front view of a liner plate assembly in the device of the present invention.
Figure 7:
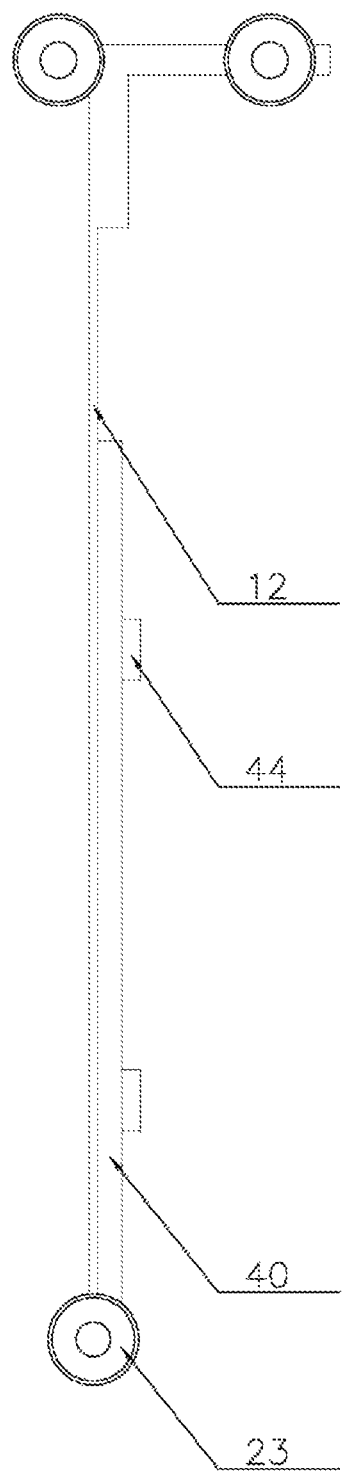
FIG. 7 is a right view of the liner plate assembly in the device of the present invention.

It can be seen from FIG. 5 to FIG. 7 that, the liner plate assembly includes a liner plate backboard 12, a guide rail 40, a slide block 44, a liner plate 41, an impact force sensor 42, a bearing 23, and a tension-compression sensor 21. The guide rail 40 is fixed on a front side of the liner plate backboard 12 with a bolt, and the slide block 44 is arranged on the guide rail 40 and slidably connected to the guide rail 40. An upper end of the liner plate 41 is connected to an upper end of the liner plate backboard 12 via the tension-compression sensor 21. One end of the tension-compression sensor 21 is connected to the liner plate 41 with a stud bolt 43, and the other end thereof is fixedly mounted to the bearing 23 with a bolt 22. One side of the impact force sensor 42 is fixed onto the liner plate backboard 12 with a bolt, and the other side thereof is in contact with a left plate surface of the hoisting container 11. The bearing 23 includes an upper bearing pair and a lower bearing pair, where two bearings of the upper bearing pair are respectively welded on two upper ends of the liner plate backboard 12, and the two bearings of the lower bearing pair are respectively welded on two lower ends of the liner plate backboard 12. Because the liner plate 41 is fixedly connected to the slide block 44, the liner plate can freely move only in a perpendicular direction. A value measured by the tension-compression sensor 21 indicates a friction force borne by the liner plate 41 when the material falls down to impact on the plate.

As shown in FIG. 1 to FIG. 3, four guide grooves 24 corresponding to the bearings are symmetrically welded up and down onto the left plate surface of the hoisting container 11, such that the bearing 23 on the liner plate backboard 12 moves in the guide grooves 24. In this way, the liner plate assembly is limited so that it can freely move only in a horizontal direction, thus enhancing measurement precision. A value measured by the impact force sensor 21 indicates an impact force borne by the liner plate 41 when the material falls down to impact on the plate.

When the self-detection device of the liner plate of the hoisting container operates, the material is added through the unloading hopper 7, conveyed to the loading hopper 1 via the baffle-type hoist conveyor 2, and delivered by the loading hopper 1 to the horizontal conveyor. Then, the horizontal conveyor conveys the material to the hoisting container system, and the material falls down. Due to the inertia to move towards the left and under the effect of gravity, the material hits the liner plate 41, to make the liner plate 41 move downwards in the guide grooves 24 corresponding to the bearings 23 along the guide rail 40 fixed on the liner plate backboard 12, and the tension-compression sensor 21 is then driven to generate readings. In addition, under the effect of an inertial impact force, the material impacts on the liner plate 41, and the impact force is transmitted to the impact force sensor 42 through the liner plate backboard 12, such that the impact force sensor generates readings. Thus, a friction force in an impact and friction process can be measured by using the tension-compression sensor 21, and an impact force in the impact and friction process can be measured by using the impact force sensor 42. Finally, the material returns back to the unloading hopper 7 through the trapezoidal opening on the unloading hopper, such that the material can be loaded to implement a continuous impact action.

An impact, friction, and wear detection method using a self-detection liner plate of a hoisting container is provided, which includes the following steps:

(1) Device assembly: Channel steels 9 are fixedly mounted to short uprights 8 of a frame 5 respectively, and directional wheels 10 are fixedly mounted to corresponding positions of four plate surfaces of a hoisting container 11. A liner plate 41, a slide block 44, a guide rail 40, and a tension-compression sensor 21 are fixedly connected onto a liner plate backboard 12, to complete assembly of a liner plate assembly. The liner plate backboard 12 and the impact force sensor 42 are fixedly mounted onto the hoisting container 11. A steel rope 14 is wound around a hand-operated capstan 17, the other end of the rope passes through a pulley 15 to connect to a lifting hook 13, and the lifting hook 13 is connected to connection rings 48 on towing plates 25, such that the lifting hook is connected to the hoisting container 11.

(2) Height adjustment: A rotation handle on the hand-operated capstan 17 is rotated to adjust the height of the hoisting container 11 to an initial position.

(3) Speed adjustment: A first variable-speed servo motor 27 and a second variable-speed servo motor 30 are started, and operation speeds of a baffle-type hoist conveyor 2 and a horizontal conveyor 16 are adjusted by adjusting frequency of a frequency converter.

(4) Parameter measurement: An impact coal material is added in a loading hopper 1, to simulate a friction motion of the liner plate of the hoisting container in an impact condition; and a friction force in an impact and friction process is measured by using the tension-compression sensor 21, and an impact force in the impact and friction process is measured by using the impact force sensor 42.

(5) Wear calculation: The variable-speed servo motors are stopped after completion of parameter measurement, to end the test; and the test coal material is collected, and the liner plate (41) is weighed before and after the experiment using a balance, to calculate a wear rate of an impact and friction motion.

When it is required to measure data at different impact angles, the rotation handle of the hand-operated capstan 17 is rotated to lower/raise the hoisting container 11, and then the impact test in steps (3) to (5) is repeated, and test parameters are recorded.

The above merely describes preferred embodiments of the present invention. It should be noted that, several improvements and modifications may be made by persons of ordinary skill in the art without departing from the principle of the present invention, and these improvements and modifications should also be considered within the protection scope of the present invention.

What is claimed is:

1. A self-detection device for a liner plate of a hoisting container, comprising: a frame (5), a baffle-type hoist conveyor (2), a horizontal conveyor (16), a loading hopper assembly, an unloading hopper assembly, a liner plate assembly, and a hoisting container system that can move up and down, wherein the loading hopper assembly is fixedly mounted to an upper right end of the frame (5), the unloading hopper assembly (7) is fixedly mounted to a lower left end of the frame (5), the hoisting container system is arranged on an upper left portion of the frame (5) and above the unloading hopper assembly (7), and the liner plate assembly is provided inside the hoisting container system; a feed port of the baffle-type hoist conveyor (2) is connected to an unloading port of the unloading hopper (7), and a discharge port thereof is joined to a loading port of a loading hopper (1); and a feed port of the horizontal conveyor (16) is connected to an unloading port of the loading hopper (1), and a discharge port thereof is arranged at a feed port on an upper end of the hoisting container system, such that falling materials can directly impact the liner plate assembly inside the hoisting container system;

the liner plate assembly comprises a liner plate backboard (12), a guide rail (40), a slide block (44), a liner plate (41), an impact force sensor (42), a bearing (23), and a tension-compression sensor (21), wherein the guide rail (40) is fixed on a front side of the liner plate backboard (12), the slide block (44) is arranged on the guide rail (40) and slidably connected to the guide rail (40), and the liner plate (41) is fixedly connected to the slide block (44); an upper end of the liner plate (41) is connected to an upper end of the liner plate backboard (12) via the tension-compression sensor (21); one end of the tension-compression sensor (21) is connected to the liner plate (41) with a stud bolt (43), and the other end thereof is fixedly mounted to the bearing (23) with a bolt (22); and one side of the impact force sensor (42) is fixed onto the liner plate backboard (12), and the other side thereof is in contact with a left plate surface of a hoisting container (11); and the bearing (23) comprises an upper bearing pair and a lower bearing pair, two bearings of the upper bearing pair are respectively disposed on two upper ends of the liner plate backboard (12), and the two bearings of the lower bearing pair are respectively disposed on two lower ends of the liner plate backboard (12);

four guide grooves (24) corresponding to the bearings are symmetrically welded up and down onto the left plate surface of the hoisting container (11), such that the bearing (23) on the liner plate backboard (12) moves in the guide grooves (24);

the tension-compression sensor (21) is used for measuring a friction force borne by the liner plate (41) when the material falls down to impact on the liner plate; and the impact force sensor (42) is used for measuring an impact force borne by the liner plate (41) when the material falls down to impact on the liner plate.

2. The self-detection device for a liner plate of a hoisting container according to claim 1, wherein the hoisting container system comprises a hoisting container (11), two towing plates (25), a lifting hook (13), a steel rope (14), a pulley (15), a pulley bracket, and a hand-operated capstan (17); a directional wheel (10) is fixed on each of four plate surfaces of the hoisting container (11); one of the two towing plates (25) is disposed on the top of a lateral side of the hoisting container (11), and the other towing plate is disposed on the top of an opposite side; the towing plates (25) are each provided with a connection ring (48); the pulley bracket is fixedly mounted on the top of the frame (5), the pulley (15) is mounted on the pulley bracket, and the hand-operated capstan (17) is mounted on the frame (5); the connection rings (48) are directly towed by the lifting hook (13); and one end of the steel rope (14) is connected to a middle portion of the lifting hook (13), and the other end passes through the pulley (15) to connect to the hand-operated capstan (17).

3. The self-detection device for a liner plate of a hoisting container according to claim 1, wherein the baffle-type hoist conveyor (2) comprises a baffle conveyor belt, a baffle-type hoist conveyor support (3), a first variable-speed servo motor (27), a first driven drum, and a first driving drum, wherein the baffle-type hoist conveyor support (3) is fixed to the frame (5), the first driven drum and the first driving drum are both provided on the baffle-type hoist conveyor support (3), the baffle conveyor belt is wounded around the first driven drum and the first driving drum, and the first variable-speed servo motor (27) is mounted on the frame (5) and the first variable-speed servo motor (27) is connected to the first driving drum in a transmission manner; the horizontal conveyor (16) comprises a horizontal conveyor belt, a horizontal conveyor support (4), a second variable-speed servo motor (30), a second driven drum, and a second driving drum, wherein the horizontal conveyor support (4) is fixed to the frame (5), the second driven drum and the second driving drum are both provided on the horizontal conveyor support (4), the horizontal conveyor belt is wounded around the second driven drum and the second driving drum, and the second variable-speed servo motor (30) is mounted on the frame (5) and the second variable-speed servo motor (30) is connected to the second driving drum in a transmission manner.

4. The self-detection device for a liner plate of a hoisting container according to claim 1, wherein the baffle-type hoist conveyor support (3) comprises a first support and a second support, the first support and the second support are both fixed to the frame (5), the first driven drum is disposed on the first support, and the first driving drum is disposed on the second support; the second support comprises a first upper support, a first lower support, and a first spiral lifting mechanism, and the first upper support and the first lower support are connected together via the first spiral lifting mechanism; the spiral lifting mechanism is mainly formed by a lead screw (34) and a rotating nut (31), wherein the rotating nut (31) is in threaded connection with the lead screw (34), the lead screw (34) is fixedly mounted on the first lower support, and the rotating nut (31) is fixedly mounted on the first upper support; the horizontal conveyor support (4) comprises a third support and a fourth support, wherein the third support and the fourth support are both fixed to the frame (5), the second driven drum is disposed on the third support, and the second driving drum is disposed on the fourth support; and the fourth support comprises a second upper support, a second lower support, and a second spiral lifting mechanism; the second upper support and the second lower support are connected together via the second spiral lifting mechanism; and the second spiral lifting mechanism is mainly formed by a lead screw (34) and a rotating nut (31), wherein the rotating nut (31) is in threaded connection with the lead screw (34), the lead screw (34) is fixedly mounted on the second lower support, and the rotating nut (31) is fixedly mounted on the second upper support.

5. The self-detection device for a liner plate of a hoisting container according to claim 1, wherein the frame (5) is mainly formed by fixedly connecting four girders (29), six beams (39), and eight uprights (36); the four girders (29) are respectively a first girder (46), a second girder (45), a third girder (49), and a fourth girder (50); the six beams (39) are respectively a first beam (53), a second beam (51), a third beam (54), a fourth beam (52), a fifth beam (55), and a sixth beam (56); the eight uprights (36) are respectively a first upright (62), a second upright (57), a third upright (58), a fourth upright (32), a fifth upright (59), a sixth upright (63), a seventh upright (61), and an eighth upright (60); the first girder (46), the first beam (53), the second girder (45) and the second beam (51) are connected end to end to form a first rectangular frame; the third girder (49), the third beam (54), the fourth girder (50), and the fourth beam (52) are connected end to end to form a second rectangular frame; the first rectangular frame and the second rectangular frame are arranged up and down oppositely; four right angles of the first rectangular frame are in one-to-one correspondence to four right angles of the second rectangular frame, wherein the four right angles of the first rectangular frame are respectively a first right angle, a second right angle, a third right angle, and a fourth right angle; a top end of the first upright (62) is connected to the first right angle, and a bottom end thereof is connected to a right angle of the second rectangular frame corresponding to the first right angle; a top end of the second upright (57) is connected to the second right angle, and a bottom end thereof is connected to a right angle of the second rectangular frame corresponding to the second right angle; a top end of the third upright (58) is connected to the third right angle, and a bottom end thereof is connected to a right angle of the second rectangular frame corresponding to the third right angle; a top end of the fourth upright (32) is connected to the fourth right angle, and a bottom end thereof is connected to a right angle of the second rectangular frame corresponding to the fourth right angle; one end of the fifth beam (55) is connected to the first girder (46), and the other end thereof is connected to the second girder (45); one end of the sixth beam (56) is connected to the third girder (49), and the other end thereof is connected to the fourth girder (50); a top end of the fifth upright (59) is connected to the second girder (45), and a bottom end thereof is connected to the fourth girder (50); a top end of the sixth upright (63) is connected to the first girder (46), and a bottom end thereof is connected to the third girder (49); the fifth beam (55), the fifth upright (59), the sixth beam (56), and the sixth upright (63) form a third rectangular frame; a top end of the seventh upright (61) is connected to the first beam (53), and a bottom end thereof is connected to the third beam (54); and a top end of the eighth upright (60) is connected to the fifth beam (55), and a bottom end thereof is connected to the sixth beam (56).

6. The self-detection device for a liner plate of a hoisting container according to claim 5, wherein the hoisting container system is provided on the frame (5) via a hoisting container system holder; the hoisting container system holder comprises three short rods, two short beams (33), four short uprights (8), and four channel steels (9); the three short rods are respectively a first short rod (20), a second short rod (37), and a third short rod; one end of the first short rod (20) is connected to the seventh upright (61), and the other end thereof is connected to the eighth upright (60); one end of the second short rod (37) is fixedly connected to the top of the seventh upright (61) of the frame (5), and the other end thereof is connected to the top of the eighth upright (60); the first short rod (20), the eighth upright (60), the second short rod (37), and the seventh upright (61) form a fourth rectangular frame; one end of the third short rod is connected to the fourth upright (32) of the frame (5), and the other end thereof is connected to the sixth upright (63); the third short rod and the first short rod (20) have the same vertical distance to the second rectangular frame; the two short beams (33) are a first short beam and a second short beam, wherein one end of the first short beam is connected to the fourth upright (32), and the other end is connected to the seventh upright (61); one end of the second short beam is connected to the sixth upright (63), and the other end is connected to the eighth upright (60); the first short beam, the first short rod (20), the second short beam, and the third short rod are connected end to end to form a fifth rectangular frame; the four short uprights (8) comprise a first short upright, a second short upright, a third short upright, and a fourth short upright, wherein a lower end of the first short upright is connected to the first short rod (20), and an upper end thereof is connected to the second short rod (37); a lower end of the second short upright is connected to the first short rod (20), and an upper end thereof is connected to the second short rod (37); a lower end of the third short upright is connected to the third short rod, and an upper end thereof is connected to the first girder (46); a lower end of the fourth short upright is connected to the third short rod, and an upper end thereof is connected to the first girder (46); the four short uprights (8) are all perpendicular to a plane in which the second rectangular frame is located; the four channel steels (9) are fixedly mounted to the first short upright, the second short upright, the third short upright, and the fourth short upright respectively; and the channel steels (9) are used as rails through which the hoisting container system moves up and down.

7. The self-detection device for a liner plate of a hoisting container according to claim 5, wherein the loading hopper assembly comprises the loading hopper (1), a first right-angle connecting groove (28), and a second right-angle connecting groove; a front end of the loading hopper (1) is fixed on the right end of the second girder (45) of the frame (5) via the first right-angle connecting groove (28), and a rear end of the loading hopper (1) is fixed on the right end of the first girder (46) of the frame (5) via the second right-angle connecting groove; the unloading hopper assembly comprises a fourth short rod (19), a fifth short rod, a third right-angle connecting groove (18), a fourth right-angle connecting groove, and the unloading hopper (7); one end of the fourth short rod (19) is connected to the first upright (62), the other end thereof is connected to the fifth upright (59), and the fourth short rod (19) and the first short rod (20) have the same vertical distance to the second rectangular frame; one end of the fifth short rod is connected to the fourth upright (32) of the frame (5), the other end thereof is connected to the sixth upright (63), and the fifth short rod and the first short rod (20) have the same vertical distance to the second rectangular frame; and a front end of the unloading hopper (7) is fixedly mounted to the fourth short rod (19) via the third right-angle connecting groove (18), and a rear end thereof is fixedly mounted to the fifth short rod via the fourth right-angle connecting groove.

8. The self-detection device for a liner plate of a hoisting container according to claim 6, wherein a lower panel of the unloading hopper (7) is provided with a trapezoidal opening; a lower end of the trapezoidal opening is connected to the third short rod, and an upper end thereof is connected to the unloading port of the unloading hopper (7); the lower end of the trapezoidal opening is higher than the upper end; and a trapezoidal filter screen (6) is welded at the trapezoidal opening of the unloading hopper (7).

9. An impact, friction, and wear detection method for the self-detection device for a liner plate of a hoisting container according to claim 1, comprising the following steps:

(1) fixing channel steels (9) to short uprights (8) of a frame (5) respectively, and fixing directional wheels (10) to corresponding positions of four plate surfaces of a hoisting container (11);

(2) fixedly connecting a liner plate (41), a slide block (44), a guide rail (40), and a tension-compression sensor (21) onto a liner plate backboard (12), to complete assembly of a liner plate assembly;

(3) fixedly mounting the liner plate backboard (12) and the impact force sensor (42) onto the hoisting container (11);

(4) winding a steel rope (14) around a hand-operated capstan (17), connecting the other end of the rope to a lifting hook (13) through a pulley (15), and connecting the lifting hook (13) to connection rings (48) on towing plates (25), such that the lifting hook is connected to the hoisting container (11);

(5) rotating a rotation handle on the hand-operated capstan (17) to adjust the height of the hoisting container (11) to an initial position;

(6) starting a first variable-speed servo motor (27) and a second variable-speed servo motor (30), and adjusting operation speeds of a baffle-type hoist conveyor (2) and a horizontal conveyor (16) by adjusting frequency of a frequency converter;

(7) adding an impact coal material in a loading hopper (1), to simulate a friction motion of the liner plate of the hoisting container in an impact condition, measuring a friction force in an impact and friction process by using the tension-compression sensor (21), and measuring an impact force in the impact and friction process by using the impact force sensor (42); and (8) stopping the variable-speed servo motors after completion of parameter measurement, to end the test; and collecting the test coal material, and weighing the liner plate (41) before and after the experiment using a balance, to calculate a wear rate of an impact and friction motion.

10. The impact, friction, and wear detection method according to claim 9, wherein when it is required to measure data at different impact angles, the rotation handle of the hand-operated capstan (17) is rotated to lower/raise the hoisting container (11), and then the impact test in steps (6) to (8) is repeated, and test parameters are recorded.

* * * * *